United States Patent
Onishi

(10) Patent No.: US 6,398,536 B2
(45) Date of Patent: Jun. 4, 2002

(54) MOLDED PRODUCT EJECTION CHECKING DEVICE

(75) Inventor: Masashi Onishi, Chiba (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/745,416

(22) Filed: Dec. 26, 2000

(30) Foreign Application Priority Data

Apr. 18, 2000 (JP) ........................................ 2000-116545

(51) Int. Cl.[7] .............................................. B29C 45/76
(52) U.S. Cl. ........................ 425/136; 425/139; 425/165
(58) Field of Search .............................. 425/136, 139, 425/165, 556; 264/334

(56) References Cited

U.S. PATENT DOCUMENTS 4,368,018 A * 1/1983 Rees et al. .................. 425/138

* cited by examiner

*Primary Examiner*—Tim Heitbrink
(74) *Attorney, Agent, or Firm*—Arent Fox Kintner Plotkin and Kahn, PLLC

(57) ABSTRACT

A torque waveform of an ejecting device when a molded product is normally ejected is memorized in a memory device 12 as a normal waveform. A sampling device 11 samples a torque waveform of the ejecting device at predetermined time intervals to produce a detected waveform when the molded product is ejected. Threshold levels are set in a controlling device 13 at arbitrary time intervals by a first setting device 14 and set operations for specifying the operations of an injection molding machine are also set in the controlling device 13 at the threshold levels by a second setting device 15. The controlling device 13 compares a normal waveform with the detected waveform to judge whether a comparative result is above or below the threshold level, and if the comparative result is above the threshold level, the controlling device 13 controls the injection molding machine based on the set operation set according to the threshold level.

6 Claims, 3 Drawing Sheets

MOLDED PRODUCT EJECTION CHECKING DEVICE

BACKGROUND OF THE INVENTION

The present invention relates to a device for checking that a molded product is projected (ejected) from a metal mold or a device for judging whether a molded product is normally molded or not in an injection molding machine.

In general, in an injection molding machine, melted resin is injected into a metal mold to mold molded products. In order to eject the molded product from the metal mold, an ejecting device is used. The ejecting device has an ejecting pin driven by a motor. When the molded product is ejected from the metal mold, the ejecting pin is inserted into the cavity of the metal mold to project the molded product from the metal mold to drop the molded product.

Incidentally, the molded product sometimes does not drop from the metal mold because of some cause (for example, the malfunction of the ejecting device). If a molding cycle is performed in this state, the metal mold may be broken or an over-packing may occur. In order to prevent such a malfunction, it is necessary to check that the molded product drops from the metal mold.

In order to check that the molded product drops, an image processing device is conventionally used. That is, the ejecting device is operated and then the picture of the inside of the metal mold is taken from outside with the image processing device. Then, it is checked from the obtained image whether the molded product is left in the metal mold or not, and if the molded product is left in the metal mold, the next molding cycle is stopped.

The above-mentioned checking method using the image processing device requires that the image processing device be adjusted every time the metal mold is replaced. Also, the image processing device is expensive.

SUMMARY OF THE INVENTION

It is an object of the present invention to provide a molded product ejection checking device which is capable of checking with reliability at low cost that a molded product is ejected.

It is another object of the present invention to provide a molded product ejection checking device which is capable of detecting the state of injection of resin and judging whether a molded product passes a pass/fail criteria.

A molded product ejection checking device according to the present invention is combined with an ejecting device for ejecting a molded product molded in an injection molding machine. The ejecting device is provided with an ejecting pin driven by a motor which is controlled by a servo controller. A torque of the motor is obtained from a torque command from the servo controller.

According to the preferred embodiment, the molded product ejection checking device includes a sampling device for sampling a torque waveform of the ejecting device to obtain a detected waveform when a molded product is ejected. Also, the molded product ejection checking device includes a memory device for memorizing the torque waveform of the ejecting device when the molded product is normally ejected as a normal waveform. Further, the molded product ejection checking device includes a controlling device for judging if the molded product is normally ejected or not by the results of comparison obtained by comparing the normal wave form with the detected waveform.

DESCRIPTION OF THE PREFERRED EMBODIMENT

A molded product ejection checking device according to the preferred embodiment of the present invention will be described with reference to FIG. 1 to FIG. 4. The molded product ejection checking device is used in combination with an ejecting device (not shown) mounted on an injection molding machine (not shown). As described above, the ejecting device has an ejecting pin driven by a motor. The ejecting device is also provided with a motor for driving the ejecting pin and a speed sensor for detecting the speed of the motor. The motor is controlled by a servo controller. When a molded product is ejected from a metal mold, the ejecting pin is projected into the cavity of the metal mold to project the molded product from the metal mold to drop the molded product.

Figure 1:
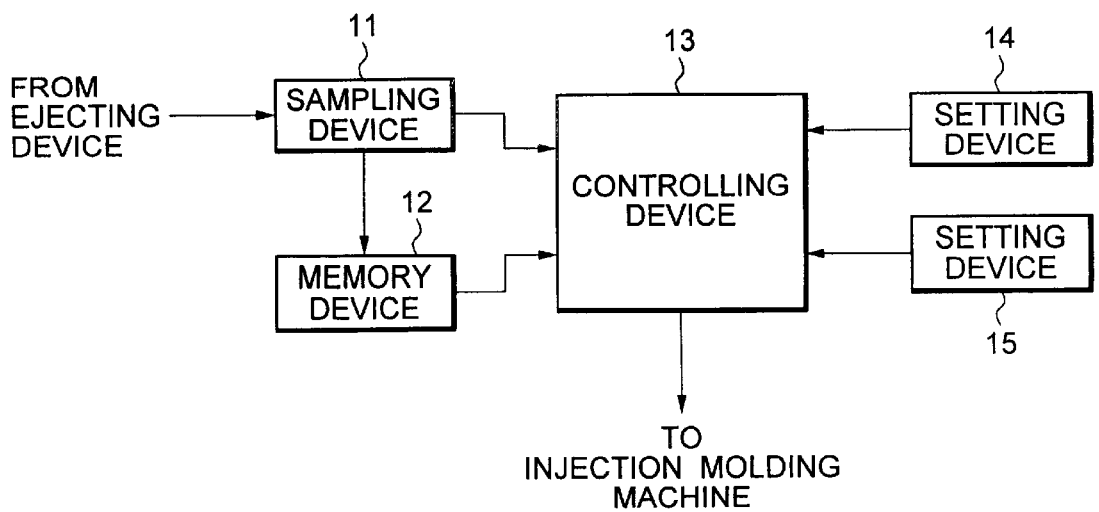
FIG. 1 is a block diagram showing the constitution of a molded product ejection checking device according to the preferred embodiment of the present invention.

In FIG. 1, the molded product ejection checking device includes a sampling device 11, a memory device 12, controlling device 13, and a first setting device 14, and a second setting device 15. The sampling device 11 samples a torque waveform based on a torque command from the servo controller at predetermined time intervals.

The operation will be described in the following. First, a prototype of a molded product is made with an injection molding machine. Then, an ejecting condition is set where a molded product can be surely ejected, that is, dropped from a metal mold. The ejecting device is operated under the ejecting condition to drop the molded product from the metal mold. Here, the sampling device 11 samples the torque waveform based on the torque command from the servo controller at the predetermined time intervals to obtain the sampling waveform to make the memory device 12 memorize it. That is, the torque waveform of the ejecting device at a normal operation is observed and is memorized in the memory device 12 as a normal waveform showing a reference value. This normal waveform will be shown by a thick solid line in FIG. 2 as the torque waveform of the ejecting device. In this connection, in FIG. 2, a speed waveform obtained by a speed sensor of the ejecting device at a normal operation will be also shown by a thin solid line as the speed waveform of the ejecting device.

A plurality of threshold levels are set by the first setting device 14. Also, the operation of the injection molding machine to the plurality of threshold levels is set by the second setting device 15. For example, a plurality of threshold levels to time intervals t1, t2, t3, t4, t5, t6 are set in the controlling device 13 by the first setting device 14. In the example shown in FIG. 2, a first threshold level of 120% (absolute value) and a second threshold level of 110% (absolute value) are set at the time interval t1, as shown in FIG. 3. Also, the operation of "stop the injection molding machine" is set as an operation corresponding to the first threshold level and the operation of "output a defective product signal" is set as an operation corresponding to the second threshold level. In this connection, similarly, the threshold levels and the operations of the injection molding machine are also set at the other time intervals t2 to t6.

Figure 3:
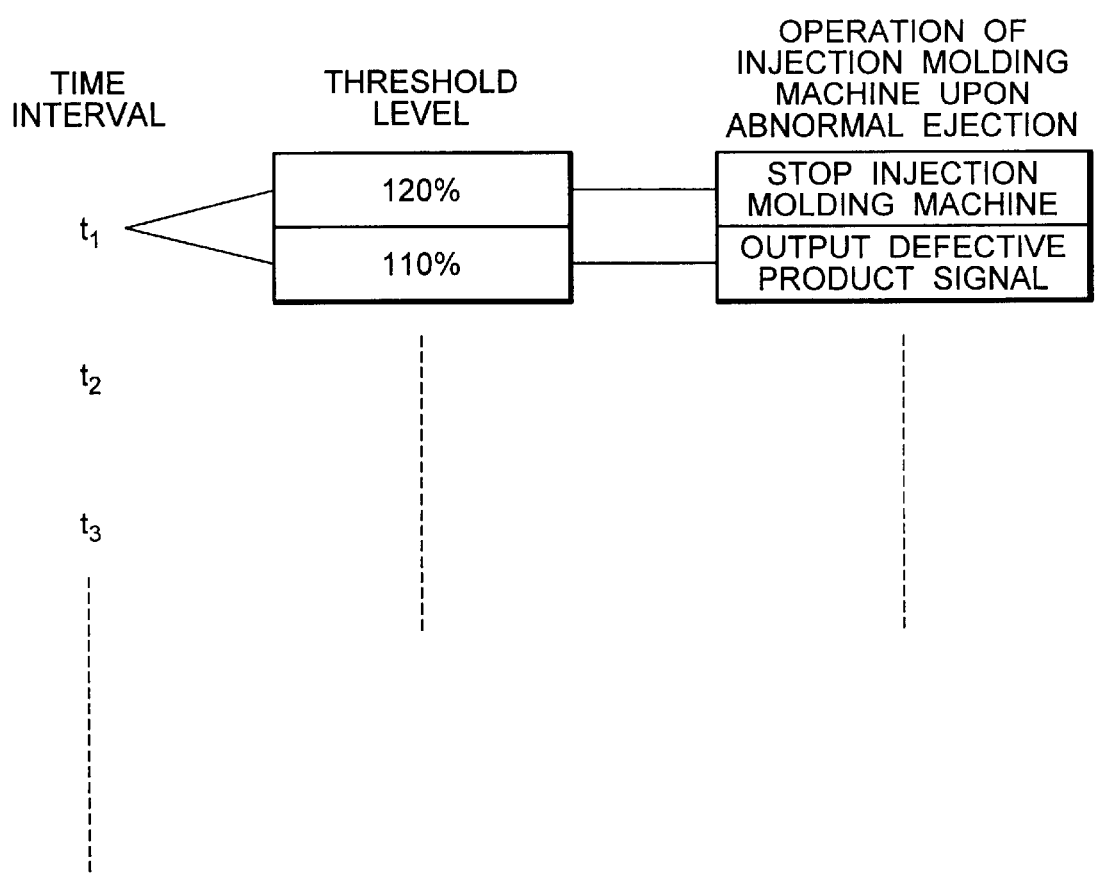
FIG. 3 is an illustration showing a threshold level set by two setting devices shown in FIG. 1 and one example of a setting operation.
Figure 4:
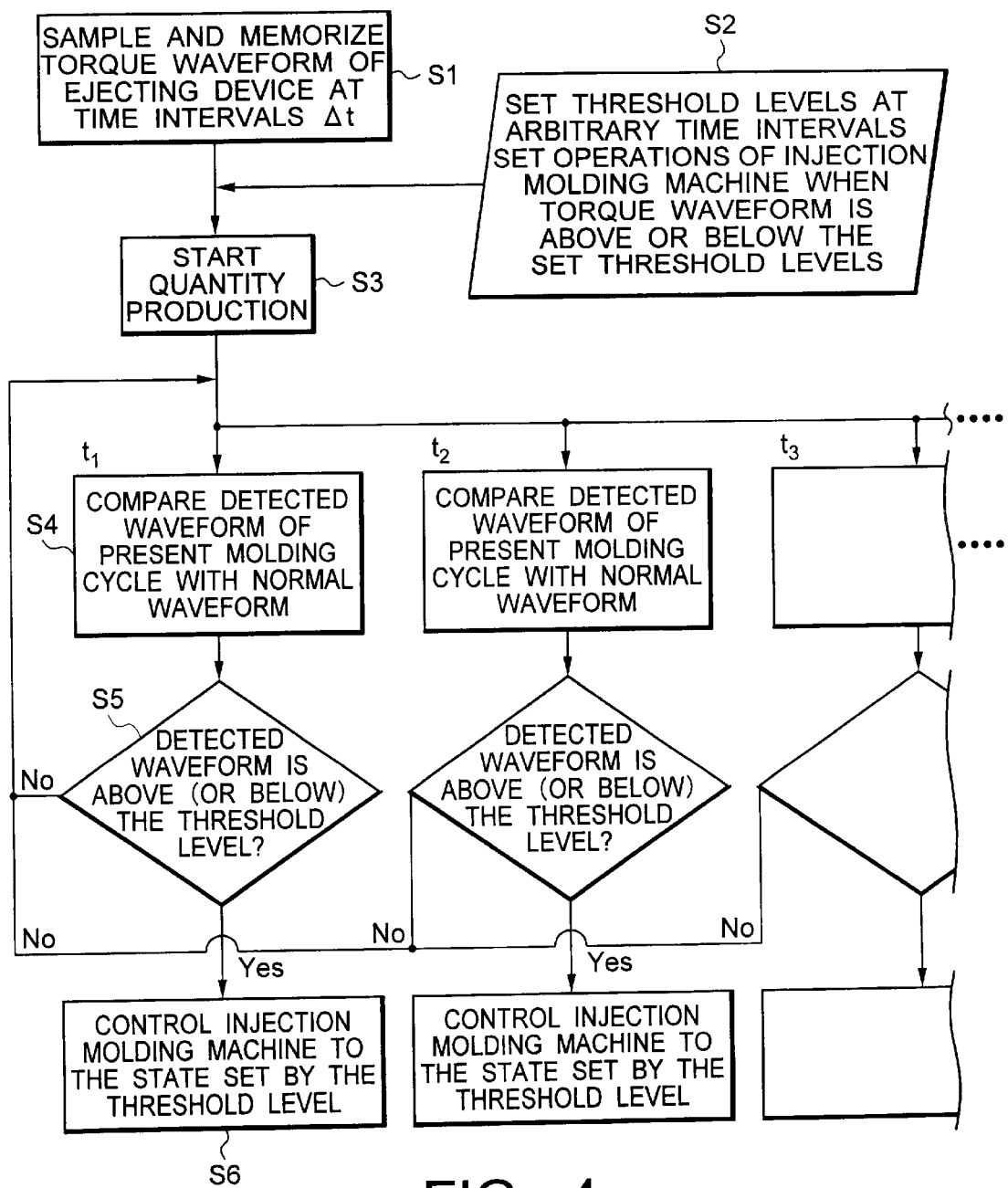
FIG. 4 is a flow chart showing one example of the operation of the molded product ejection checking device shown in FIG. 1.

The operation will be described in detail with reference to FIG. 4 in addition to FIGS. 2 and 3. As described above, first, in the state where the molded product is normally ejected, the torque waveform of the ejecting device is sampled at predetermined time intervals (Δt) by the sampling device 11 and is memorized as a normal waveform into the memory device 12 (step S1). At a step S2, the threshold level is set at each time interval described above by the use of the first setting device 14. In addition, the operation of the injection molding machine when a comparative result (described below) is above or below the set threshold level is set by the use of the second setting device 15.

When setting operations are finished in the manner described above, quantity production is started by the injection molding machine (step S3). When the quantity production is started, the sampling device 11 samples the torque waveform of the ejecting device at the predetermined time intervals to produce a detected waveform. The obtained detected waveform is applied to the controlling device 13. The controlling device 13 produces a comparative result by comparing the sampling waveform read out from the memory device 12 with the detected waveform for the time interval t1 (step S4). The controlling device 13 judges if the comparative result is above or below the threshold level set for the time interval t1 (step S5). If the comparative result is below the threshold level, the step of the controlling device 13 proceeds to the judgment of the comparative result for the next time interval t2. On the other hand, if the comparative result is above the threshold level, the controlling device 13 performs the operation set for the threshold level of the time interval t1 (step S6).

Similarly, the controlling device 13 performs like operations as described above at time intervals t2 to t6 to check that the molded product is dropped by the ejecting device.

Figure 2:
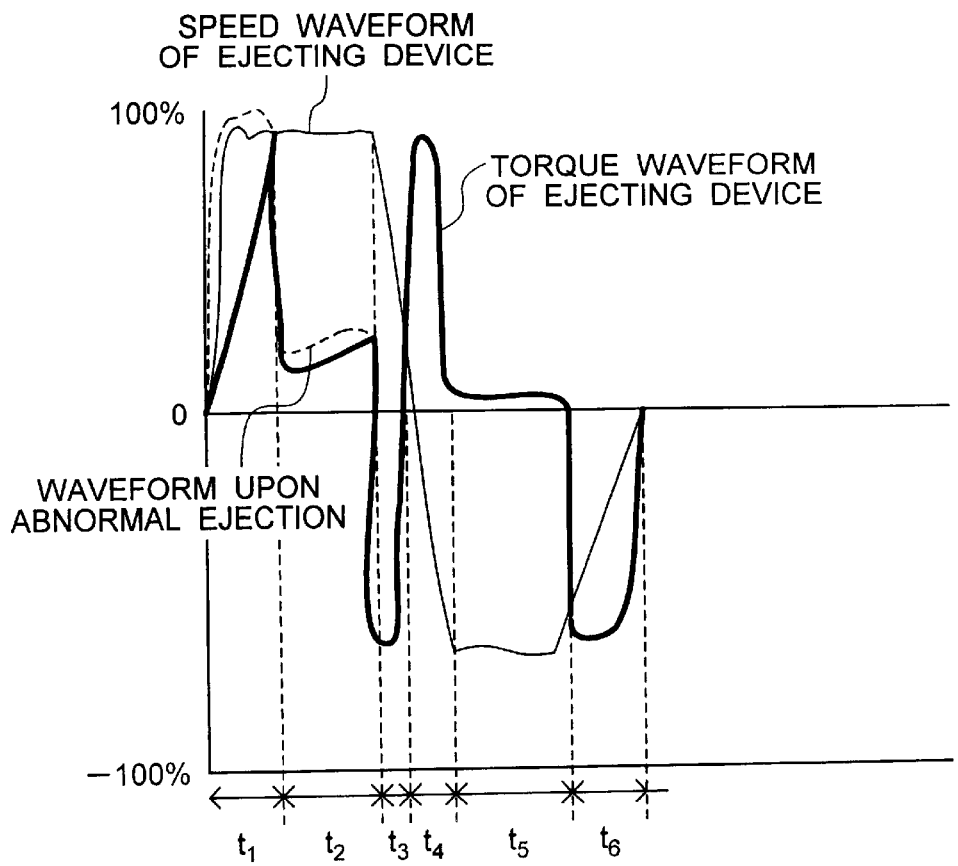
FIG. 2 is an illustration showing one example of a torque waveform obtained from the motor of an ejecting device.

Since the torque waveform (detected waveform) of the ejecting device is shifted from the normal waveform when the molded product is abnormally ejected, as shown by a broken line in FIG. 2, it is possible to check the abnormal ejection of the molded product by comparing the detected waveform with the normal waveform.

In this connection, while the plurality of threshold levels are set at arbitrary time intervals in the above description, they may be set at sampling time intervals (Δt) of the sampling device 11. Also, the threshold level may be set in a given range instead of a single level. In this case, the controlling device 13 judges if the comparative result is in the set range or not.

On the other hand, even in the case where the metal mold is not normally filled with resin, the torque waveform of the ejecting device is different from the torque waveform produced when the metal mold is normally filled with the resin. Even in this case, the controlling device 13 compares the detected waveform with the normal waveform. It is possible to prevent the occurrence of troubles such as a broken metal mold or the like and to judge whether a molded product passes a pass/fail criteria or not by specifying the operation of the injection molding machine according to whether or not the comparative result exceeds the predetermined threshold level.

As described above, since the present invention judges whether the molded product is normally ejected or not by comparing the detected torque waveform of the ejecting device when the volume production is performed with the normal torque waveform when the ejecting device is normally operated, it produces an effect of checking the ejection of the molded product at low cost with reliability and also can judge whether the molded product passes a pass/fail criteria or not.

While the present invention has been described in connection with a preferred embodiment thereof, it will be understood that it is not intended to limit the invention to that embodiment. On the other hand, it is intended to cover alternatives, modifications, and equivalents as may be included within the spirit and scope of the invention as defined by the following appended claims.

What is claimed is:

1. A molded product ejection checking device combined with an ejecting device for ejecting a molded product in an injection molding machine, wherein the ejecting device is provided with an ejecting pin driven by a motor which is controlled by a servo controller, a torque of the motor being obtained from a torque command from the servo controller, the molded product ejection checking device comprising:

a sampling device for sampling a torque waveform of the ejecting device to produce a detected waveform when the molded product is ejected;

a memory device for memorizing the torque waveform of the ejecting device when the molded product is normally ejected as a normal waveform; and a controlling device for judging if the molded product is normally ejected or not according to the comparative result obtained by comparing the normal waveform with the detected waveform.

2. A molded product ejection checking device as claimed in claim 1, wherein the sampling device samples the torque waveform of the ejecting device at predetermined time intervals, wherein threshold levels are set in the controlling device at arbitrary or the predetermined time intervals, and wherein the controlling device checks whether the molded product is normally ejected or not according to whether the comparative result is above or below the threshold level.

3. A molded product ejection checking device as claimed in claim 2, wherein an operation for specifying the operation of the injection molding machine is set in the controlling device for each threshold level and wherein the controlling device controls the injection molding machine based on the set operation.

4. A molded product ejection checking device as claimed in claim 3, further comprising a setting device for setting the threshold levels and the set operations.

5. A molded product ejection checking device as claimed in claim 4, wherein the normal waveform is memorized in the memory device by making a prototype of a molded product before the injection molding machine starts a quantity production and wherein after the normal waveform is memorized in the memory device, the threshold levels and the set operations are set in the controlling device before the quantity production is started.

6. A molded product ejection checking device as claimed in any one of claims 1 to 4, wherein the controlling device further checks whether the molded product is normally molded or not and judges whether the molded product passes a pass/fail criteria or not according to the comparative result obtained by comparing the normal waveform with the detected waveform.

* * * * *